United States Patent
McCullagh et al.

(10) Patent No.: US 9,704,155 B2
(45) Date of Patent: Jul. 11, 2017

(54) PASSING PAYMENT TOKENS THROUGH AN HOP/SOP

(75) Inventors: Niall McCullagh, Omagh (IE); Seamus Cushley, Castledawson (IE)

(73) Assignee: Visa International Service Association, San Francisco, CA (US)

( * ) Notice: Subject to any disclaimer, the term of this patent is extended or adjusted under 35 U.S.C. 154(b) by 905 days.

(21) Appl. No.: 13/559,250

(22) Filed: Jul. 26, 2012

(65) Prior Publication Data

US 2013/0031006 A1 Jan. 31, 2013

Related U.S. Application Data

(60) Provisional application No. 61/513,337, filed on Jul. 29, 2011.

(51) Int. Cl.
*G06Q 40/00* (2012.01)
*G06Q 20/36* (2012.01)

(52) U.S. Cl.
CPC ........... *G06Q 20/36* (2013.01); *G06Q 20/363* (2013.01)

(58) Field of Classification Search
CPC ................................................. G06Q 20/36
USPC ......................................................... 705/44
See application file for complete search history.

(56) References Cited

U.S. PATENT DOCUMENTS

| | | |
|---|---|---|
| 5,613,012 A | 3/1997 | Hoffman et al. |
| 5,781,438 A | 7/1998 | Lee et al. |
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |

(Continued)

FOREIGN PATENT DOCUMENTS

| | | |
|---|---|---|
| EP | 2156397 A1 | 2/2010 |
| WO | 0135304 A1 | 5/2001 |

(Continued)

OTHER PUBLICATIONS

U.S. Appl. No. 61/529,487, filed Aug. 31, 2011, by Anderson.

(Continued)

*Primary Examiner* — Edward Chang
(74) *Attorney, Agent, or Firm* — Kilpatrick Townsend & Stockton LLP

(57) ABSTRACT

Embodiments of the invention are directed to methods, a computer-readable medium, servers and systems for enabling merchants to pass payment tokens, instead of actual payment information, to third party HOPs and SOPs. This, for example, enables a merchant to charge a consumer, such as on a recurring basis or for a one-off purchase, without having the consumer enter payment information each time and without the merchant actually having to handle payment information. As such, merchants can avoid costs and responsibilities associated with handling and storing consumer payment data, while at the same time it also gives merchants the benefit of engaging in purchase transactions with consumers without requiring that the consumers reenter payment data each time they want to make a purchase.

17 Claims, 12 Drawing Sheets

(56) References Cited

U.S. PATENT DOCUMENTS

| | | |
|---|---|---|
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |

(56) References Cited

U.S. PATENT DOCUMENTS

| | | |
|---|---|---|
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,838,982 B2 | 9/2014 | Carlson et al. |
| 8,887,308 B2 | 11/2014 | Grecia |
| 9,065,643 B2 | 6/2015 | Hurry et al. |
| 9,070,129 B2 | 6/2015 | Sheets et al. |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0098313 A1 | 5/2004 | Agrawal et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0080170 A1 | 4/2006 | Roach et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2008/0319869 A1 | 12/2008 | Carlson et al. |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0072020 A1 | 3/2009 | Hull |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0240594 A1 | 9/2009 | Kerner et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0119155 A1 | 5/2011 | Hammad et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |

(56) References Cited

U.S. PATENT DOCUMENTS

| | | |
|---|---|---|
| 2011/0295745 A1 | 12/2011 | White et al. |
| 2011/0302081 A1 | 12/2011 | Saunders et al. |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123924 A1 | 5/2012 | Rose et al. |
| 2012/0123940 A1 | 5/2012 | Killian et al. |
| 2012/0124496 A1 | 5/2012 | Rose et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0209677 A1 | 8/2012 | Mehta et al. |
| 2012/0215648 A1 | 8/2012 | Rose et al. |
| 2012/0215688 A1 | 8/2012 | Musser et al. |
| 2012/0215696 A1 | 8/2012 | Salonen |
| 2012/0215701 A1 | 8/2012 | Mehta et al. |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1* | 8/2013 | Anderson et al. ............... 705/44 |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |

(56) References Cited

U.S. PATENT DOCUMENTS

| | | |
|---|---|---|
| 2014/0188586 A1 | 7/2014 | Carpenter et al. |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |

FOREIGN PATENT DOCUMENTS

| | | |
|---|---|---|
| WO | 0135304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012/054786 A1 | 4/2012 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

International Search Report and Written Opinion of the International Searching Authority issued in Application No. PCT/US2012/048406 on Mar. 15, 2013, 11 pages.
Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
Wang, U.S. Appl. No. 62/000,288 (unpublished), Payment System Canonical Address Format, filed May 19, 2014.
Sharma et al., U.S. Appl. No. 62/003,717 (unpublished), Mobile Merchant Application, filed May 28, 2014.
Kalgi et al., U.S. Appl. No. 62/024,426, (unpublished) Secure Transactions Using Mobile Devices, filed Jul. 14, 2014.
Prakash et al., U.S. Appl. No. 62/037,033 (unpublished), Sharing Payment Token, filed Aug. 13, 2014.
Hoverson et al., U.S. Appl. No. 62/038,174 (unpublished), Customized Payment Gateway, filed Aug. 15, 2014.
Wang, U.S. Appl. No. 62/042,050 (unpublished), Payment Device Authentication and Authorization System, filed Aug. 26, 2014.
Gaddam et al., U.S. Appl. No. 62/053,736 (unpublished), Completing Transactions Without a User Payment Device, filed Sep. 22, 2014.
Patterson, U.S. Appl. No. 62/054,346 (unpublished), Mirrored Token Vault, filed Sep. 23, 2014.
Dimmick, U.S. Appl. No. 14/952,514 (unpublished), Systems Communications With Non-Sensitive Identifiers, filed Nov. 25, 2015.
Dimmick, U.S. Appl. No. 14/952,444 (unpublished), Tokenization Request Via Access Device, filed Nov. 25, 2015.
Prakash et al., U.S. Appl. No. 14/955,716 (unpublished), Provisioning Platform for Machine-To-Machine Devices, filed Dec. 1, 2015.
Wong et al., U.S. Appl. No. 14/966,948 (unpublished), Automated Access Data Provisioning, filed Dec. 11, 2015.
Stubbs et al., U.S. Appl. No. 62/103,522 (unpublished), Methods and Systems for Wallet Provider Provisioning, filed Jan. 14, 2015.
McGuire, U.S. Appl. No. 14/600,523 (unpublished), Secure Payment Processing Using Authorization Request, filed Jan. 20, 2015.
Flurscheim et al., U.S. Appl. No. 15/004,705 (unpublished), Cloud-Based Transactions With Magnetic Secure Transmission, filed Jan. 22, 2016.
Flurscheim et al., U.S. Appl. No. 62/108,403 (unpublished), Wearables With NFC HCE, filed Jan. 27, 2015.
Sabba et al., U.S. Appl. No. 15/011,366 (unpublished), Token Check Offline, filed Jan. 29, 2016.
Patterson, U.S. Appl. No. 15/019,157 (unpublished), Token Processing Utilizing Multiple Authorizations, filed Feb. 9, 2016.
Cash et al., U.S. Appl. No. 15/041,495 (unpublished), Peer Forward Authorization of Digital Requests, filed Feb. 11, 2016.
Le Saint et al., U.S. Appl. No. 15/008,388 (unpublished), Methods for Secure Credential Provisioning, filed Jan. 27, 2016.
Kinagi, U.S. Appl. No. 62/117,291 (unpublished), Token and Cryptogram Using Transaction Specific Information, filed Feb. 17, 2015.
Galland et al. U.S. Appl. No. 62/128,709 (unpublished), Tokenizing Transaction Amounts, filed Mar. 5, 2015.
Rangarajan et al., U.S. Appl. No. 61/751,763 (unpublished), Payments Bridge, filed Jan. 11, 2013.
Li, U.S. Appl. No. 61/894,749 (unpublished), Methods and Systems for Authentication and Issuance of Tokens in a Secure Environment, filed Oct. 23, 2013.
Aissi et al., U.S. Appl. No. 61/738,832 (unpublished), Management of Sensitive Data, filed Dec. 18, 2012.
Wong et al., U.S. Appl. No. 61/879,362 (unpublished), Systems and Methods for Managing Mobile Cardholder Verification Methods, filed Sep. 18, 2013.
Powell, U.S. Appl. No. 61/892,407 (unpublished), Issuer Over-The-Air Update Method and System, filed Oct. 17, 2013.
Powell, U.S. Appl. No. 61/926,236 (unpublished), Methods and Systems for Provisioning Mobile Devices With Payment Credentials and Payment Token Identifiers, filed Jan. 10, 2014.

* cited by examiner

PASSING PAYMENT TOKENS THROUGH AN HOP/SOP

CROSS-REFERENCES TO RELATED APPLICATIONS

This application claims the benefit of U.S. Provisional Application No. 61/513,337, filed Jul. 29, 2011, which is hereby incorporated by reference in its entirety for all purposes.

BACKGROUND

1. Field of the Art

Generally, payment processing for online retail businesses is described. Specifically, third party-assisted tokenization and payment processing are described.

2. Discussion of the Related Art

A "hosted order page" (HOP) is a third-party hosted webpage that accepts payment information from customers on behalf of merchants. A merchant website typically redirects a customer to an HOP on the third-party's domain/server when the customer selects a 'Buy' or 'Checkout' button from an online shopping cart. Once at the HOP, the customer inputs payment information, such as credit card information. The third-party, which is neither the merchant nor the customer, uses the payment information entered by the customer to process the purchase transaction for the merchant so that the merchant can avoid handling the customer's payment information, and thereby avoid the cost and effort of complying with the Payment Card Industry Data Security Standard (PCI DSS) and government regulations regarding storing sensitive payment information.

A "silent order post" (SOP) is akin to an HOP but with only the sensitive textboxes and other input controls being hosted by the third party. That is, the merchant hosts the order page but the sensitive fields, such as the credit card number and expiration date entry textboxes, are posted only to the third party's servers.

Oftentimes, online merchants enable consumers to create an account/profile on the merchant's webserver and store their payment information (e.g., credit-card information) in the account/profile. This way, instead of the consumers having to enter payment information each time they want to make a purchase from the merchant's website, the merchant can use the stored payment information to process the transaction. Also, for example, merchants use stored payment information to charge consumers on a recurring basis. For example, an online newspaper publisher may charge its subscribers once per month.

Merchants that utilize an HOP/SOP and therefore do not store or have access to consumers' payment information cannot charge consumers, either for one-time or recurring payments, without instructing the consumers to input their payment information each time. Requesting consumers to input their payment information each time the consumer wants to make a purchase or each time a recurring payment needs to be made can be burdensome to consumers and could result in missed sales opportunities and consumers delaying or missing payments.

BRIEF SUMMARY

Embodiments of the invention are directed to methods, a computer-readable medium, servers and systems for enabling merchants to pass payment tokens, instead of actual payment information, to third party HOPs and SOPs. This, for example, enables merchants to charge consumers, such as on a recurring basis or for a one-off purchase, without having the consumer enter payment information each time and without the merchant actually having to handle payment information and therefore incur costs associated with PCI compliance.

An example will now be provided for the purpose of illustrating embodiments of the invention. This example will be provided in the context of a consumer purchasing an item from a merchant website. The example generally begins with the consumer identifying an item of interest on the merchant's website. Upon identifying the item of interest, the consumer clicks on a link associated with the item and thereby navigates to a page on the merchant website that provides details about the item, along with an "Add to Cart" button. The user selects the "Add to Cart" button and causes the merchant to add the item to a virtual cart. The user then selects a "Go to Cart" button and thereby navigates to the virtual cart. The virtual cart displays order information, which includes a summary description of the item as well as line item data, such as quantity, price, taxes, shipping costs, etc. The virtual cart also prompts the consumer to create an account with the merchant. For example, the virtual cart may have a checkbox that the consumer can select to indicate that the consumer would like to create an account and/or the virtual cart may prompt the user to provide his name, email address and/or userID, and a password for the purpose of creating new account.

After checking the box and/or providing account information, the user selects a "Checkout" or "Submit" button. In response, the merchant redirects the consumer to an HOP that is provided by a merchant service provider for payment authorization. In doing so, the merchant sends the authorization request and order information along with a request to create an account for the consumer to the merchant service provider. The request for the merchant service provider to create an account for the consumer is sometimes referred to herein as a subscription request. The order information, the authorization request, and the request to create an account may be sent to the merchant service provider in the form of an HTML post, for example. The HOP, which is provided by the merchant service provider, displays a payment page to the consumer. The payment page renders the order information and prompts the consumer to input his payment information, such as credit card or e-check information. The merchant service provider then creates an account for the consumer on the merchant service provider's database, stores the payment information in the user account, tokenizes the payment information, stores a payment token that results from the tokenization in the user account, and then sends a copy of the payment token back to the merchant.

The merchant stores the copy of the payment token on the merchant's database. For example, the merchant creates an account for the user on the merchant's database and stores the payment token in the user's account. In future transactions with the consumer, the merchant can pass the payment token through the HOP to the merchant service provider. This enables the merchant to avoid requesting the consumer to input payment information. After the merchant passes the payment token through the HOP to the merchant service provider, the merchant service provider accesses the consumer's account on the merchant service provider's database and verifies the payment token received from the merchant against the payment token stored in the merchant service provider's database. If the payment token is verified, the merchant service provider uses the payment information stored on the merchant service provider's database to process the purchase transaction on behalf of the merchant.

For example, if the consumer signs up for a subscription (e.g., online newspaper subscription) with the merchant that involves recurring payment, the merchant can simply pass the payment token associated with the consumer to the HOP each time a payment is due, and thereby cause the merchant service provider to process the payment. Also for example, when the consumer visits the merchant website in the future to purchase one or more items, the merchant can pass the consumer's payment token to the merchant service provider and avoid prompting the consumer to enter his payment information. Embodiments of this invention provide the advantage of, for example, being able to utilize an HOP and avoid having to store or have access to consumers' payment information, while at the same time avoid the need for consumers to input their payment information each time a payment needs to be processed.

An embodiment relates to a method comprising receiving order information and a request to create an account from a merchant, the order information associated with a purchase transaction between a user and the merchant, the account being for the purpose of storing payment information of the user at the merchant service provider, rendering a hosted payment page on behalf of the merchant, the hosted payment page presenting to the user at least a portion of the order information and at least an input field into which the user may input the payment information, receiving the payment information from the user, processing the purchase transaction between the user and the merchant using the payment information, creating an account for the user if the user does not already have an account, tokenizing the payment information so as to create a payment token, storing the payment information and the payment token in the account, and sending a copy of the payment token to the merchant, the merchant being able to submit the payment token in future purchase transactions between the merchant and the user, thereby eliminating the need for the user to resubmit the payment information in future purchase transactions between the merchant and the user.

Another embodiment relates to a method comprising receiving, at a merchant service provider, order information and a request to create an account from a merchant server of a merchant, the order information associated with a purchase transaction between a user and the merchant, the account being for the purpose of storing payment information of the user at the merchant service provider, receiving, at the merchant service provider, payment information from the user who is engaging in the purchase transaction with the merchant, wherein the payment information is sent to the merchant service provider from a device associated with the user and wherein the payment information bypasses the merchant server, creating, at the merchant service provider, an account for the user, storing, at the merchant service provider, the payment information of the user in the account of the user, tokenizing, at the merchant service provider, the payment information in the account of the user so as to create a payment token that represents the payment information of the user, and transmitting, from the merchant service provider, a copy of the payment token to the merchant server.

Another embodiment relates to a system comprising a processor, a memory device including instructions that, when executed by the processor, cause the processor to: receive from a merchant server of a merchant order information and a request to create an account, the order information associated with a purchase transaction between a user and the merchant, the account being for the purpose of storing payment information of the user at the merchant service provider; receive payment information from the user who is engaging in the purchase transaction with the merchant, wherein the payment information is sent to the merchant service provider from a device associated with the user and wherein the payment information bypasses the merchant server; create an account for the user; store the payment information of the user in the account of the user; tokenize the payment information in the account of the user so as to create a payment token that represents the payment information of the user; and transmit a copy of the payment token to the merchant server.

Other embodiments of the invention are directed to computer-readable media comprising code for performing the above-described methods as well as systems, apparatuses and devices that perform the methods and/or that use the computer-readable media.

These and other embodiments of the invention are described in further detail below.

DETAILED DESCRIPTION

Figure 1:
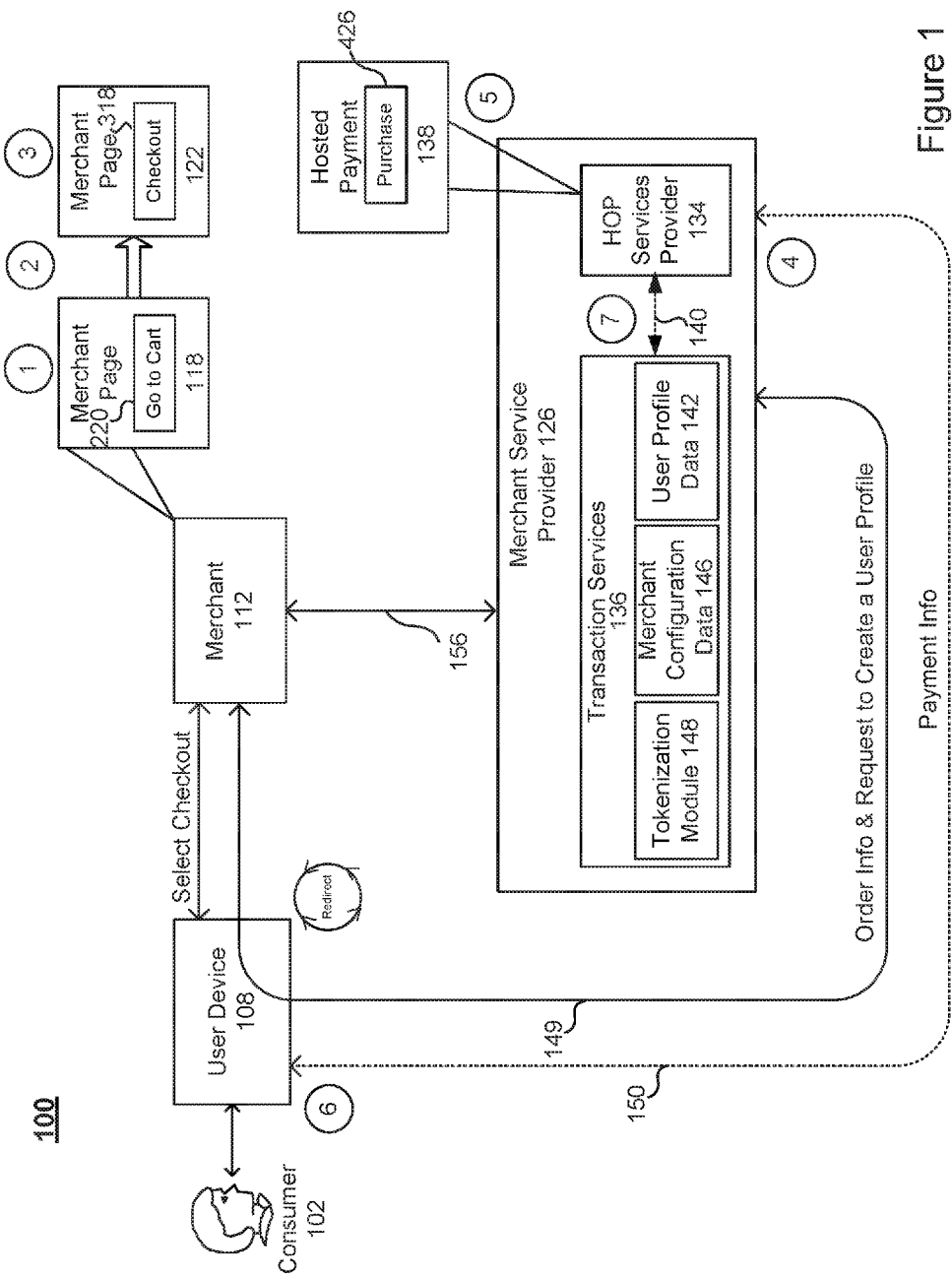
FIG. 1 provides a block diagram of an example operating environment in which embodiments of the invention can be implemented.

Embodiments of the invention are directed to methods, a computer-readable medium, servers and systems for enabling merchants to pass tokenized payment information, e.g., payment tokens, instead of actual payment information, to HOPs and SOPs that are provided by third-party merchant service providers. The example methods, a computer-readable medium, servers and systems provide the advantage of enabling merchants to charge consumers without having to handle actual payment information. This enables merchants to avoid the costs associated with PCI compliance and other disadvantages that go along with handling consumer payment information. Further advantages include merchants being able to submit a purchase transaction to an HOP/SOP without the relevant consumer having to provide payment information at the time of the transaction. Thus, the consumer does not have to participate in the purchase transaction. For example, the consumer may provide payment information to the HOP/SOP during an initial account setup, the HOP/SOP can tokenize the payment information and pass a payment token to the merchant, and the merchant can thereafter submit the payment token in subsequent purchase transactions without the consumer's involvement. For example, when the consumer attempts to make a future purchase from the merchant (e.g., the consumer makes a subsequent purchase from the merchant's website), the merchant can pass the payment token to the HOP/SOP instead of the user having to reenter payment information. This streamlines the payment process for consumers and merchants. This also enables merchants to bill consumers on a recurring basis by simply passing payment tokens through the HOP/SOP.

A "purchase transaction" can be an electronic transaction involving a user, such as a consumer, and a merchant, where the user purchases an item or service from the merchant. An example includes a consumer making an online credit-card purchase on a merchant website.

"Order information" may include information about an electronic transaction, such as information about the item(s) to be purchased, payment amounts, sales tax, shipping address, shipping type (e.g., overnight, one-day, standard), carrier, shipping & handling costs, special requests (e.g., gift wrapping), etc. It may also include information about the consumer making the transactions, such as name, address, email address, purchase history, profile information, and any other information that may be used to measure the level of risk associated with the electronic transaction.

"Payment information" may include information associated with financial accounts, such credit-card accounts, debit-card accounts, demand accounts (e.g., checking accounts, money market accounts), prepaid accounts, eWallet accounts, etc. Examples of such information include payment account numbers ("PANs"), expiration dates, bank routing numbers, checking account numbers, etc.

A "merchant service provider" can be any entity that provides services in support of electronic transactions. Examples of such services include using HOPs and/or SOPs to collect payment information and/or order information and using that information to process purchase transactions and/or evaluate fraud risk in purchase transactions. A merchant service provider may include both a payment service and a fraud detection service.

FIG. 1 is a block diagram of an example of an operating system 100 in which embodiments of the invention can be implemented.

FIG. 1 depicts a consumer 102, a user device 108 associated with the consumer 102, a merchant 112 and associated merchant pages 118 and 122, and a merchant service provider 126 ("service provider"), communicatively connected. The service provider 126 includes transaction services 136 and HOP services provider 134, which provides a hosted payment page 138. The transaction services 136 includes user profile/account data 142 and merchant configuration data 146 as well as a tokenization module 148. The system 100 illustrated in FIG. 1 is referred to as a hosted service system 100, wherein the service provider 126, acting as a "host", hosts services for clients, such as the merchant 112. According to the illustrated embodiment, the merchant 112 and the consumer 102 can transmit information associated with electronic transactions to the service provider 126. According to some embodiments, the merchant 112 may transmit information, such as order information, or a request to create an account and to tokenize payment information, to the service provider 126, which performs one or more services based at least on the transaction information received from the merchant 112.

The consumer 102 is, generally, any entity that is a purchaser of products or services via an electronic transaction. Non-limiting examples include a person or business entity that purchases or licenses goods and services from merchants via the public Internet or at a retail store using a credit card, debit card, e-check, etc. The merchant 112 is, generally, any entity that offers goods or services in exchange for value.

The service provider 126 may be a third party other than the consumer and merchant, that provides services in support of electronic transactions. Non-limiting examples of such services include services related to payment acceptance processing (e.g., HOP and SOP), credit card authorization, payment information tokenization, risk evaluation and management, fraud screening, tax calculation, export compliance verification, delivery address verification, Internet and/or e-mail address verification, payment crediting, billing, and the like. Service providers 126 may invoke service features of other service providers in support of their service offerings.

The consumer 102 and the merchant 112 may communicate through a network, such as with Internet-originated transactions. As part of a purchasing process, certain information is collected from the consumer 102 by the merchant 112. Non-limiting examples of information collected from the consumer 102 include information about the item to be purchased, payment information, shipping address, and whether the consumer wants to create an account with the merchant. However, as discussed above, some merchants may opt to not collect payment information, such as credit or bank card payment account numbers. For example, some merchants opt not to collect payment information because merchants want to avoid the costs associated with PCI compliance.

Once various transaction and customer-related information is collected by the merchant 112, the merchant transmits at least a portion of the information to the service provider 126. Additional information may be transmitted along with the information described. For example, the merchant 112 may transmit customized data or a specification of service provider 126 services to apply, or to ignore, in the electronic transaction processing that is provided by the service provider 126. Furthermore, according to embodiments described herein, customer-specified service strategies and schedules (e.g. schedules for recurring payments) may also be transmitted from the merchant 112 to the service provider 126. Any or all of the information referenced above, which is transmitted from the merchant 112 to the service provider 126, may be transmitted through a network in any suitable protocol. An example of a suitable protocol is Secure Sockets Layer (SSL). The service provider 126 then performs one or more services in relation to the electronic commercial transaction associated with transmitted transaction information.

An example will now be provided with reference to the encircled reference numerals 1-7 provided in FIG. 1. It should be appreciated that the encircled reference numerals are provided for illustrative convenience and are not intended to limit ways in which data may flow or the order in which steps may be executed in the system 100. For example, data may flow to and from any component of the system 100 in any order. This example will be discussed with reference to FIGS. 1-4.

Figure 2:
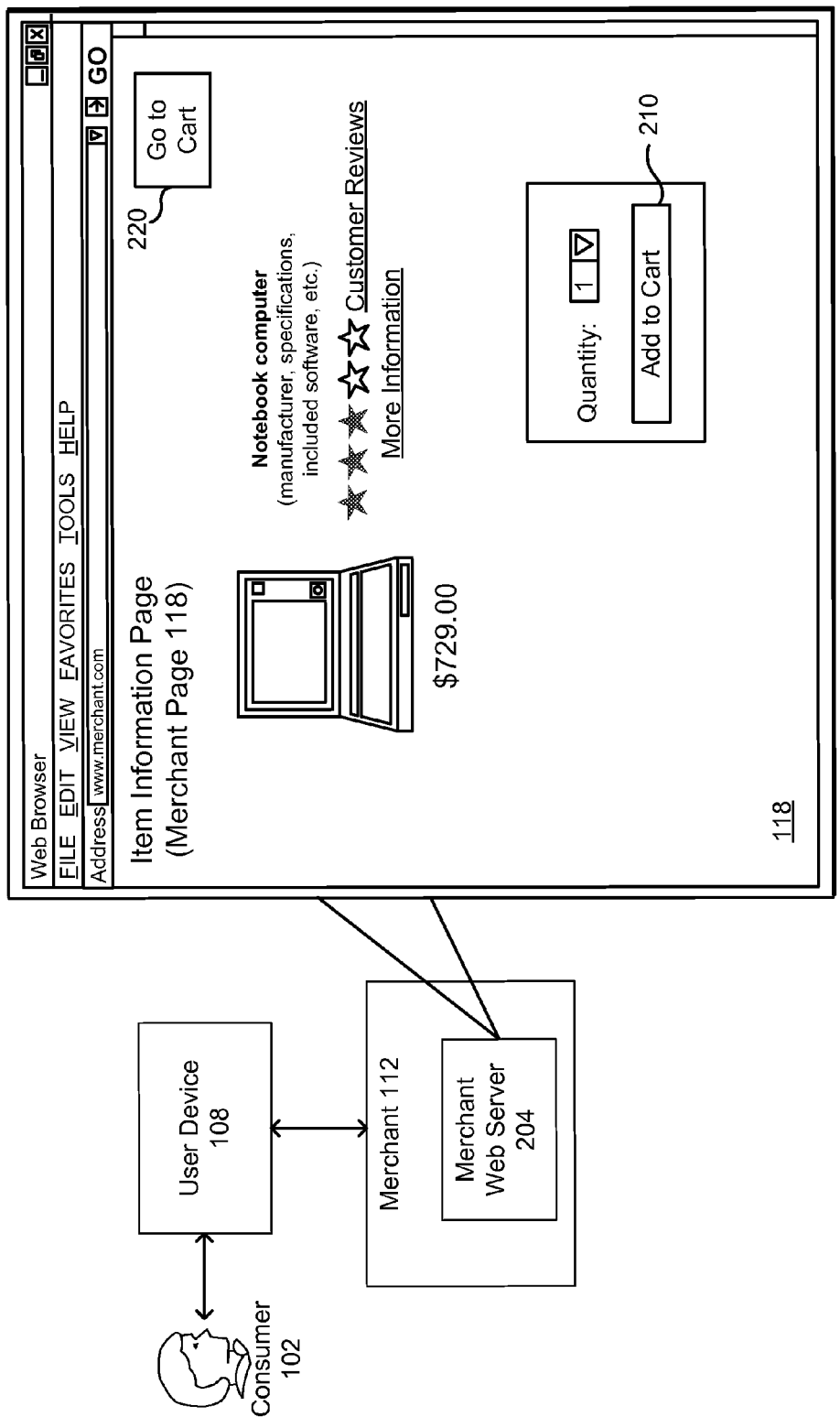
FIG. 2 provides an illustration of an example merchant webpage, according to an embodiment.

Referring to encircled reference numeral 1 of FIG. 1, this example begins with the consumer 102 visiting the merchant page 118 (see FIG. 2), which is provided by a merchant web server 204. While visiting the merchant page 118, the consumer 102 can view details for a particular item. For example, as illustrated in FIG. 2, the consumer 102 may view details of the item, which is a notebook computer. Further, while visiting the merchant page 118, the consumer 102 may select the "Add to Cart" button 210 to add the item to his or her electronic shopping cart. The consumer 102 may then select the "Go to Cart" button 220 to navigate to a webpage that displays order information for the item(s) that is in the consumer's electronic shopping cart.

Referring now to encircled reference numeral 2, when the consumer selects the "Go to Cart" button 220, the merchant server 204 obtains the order information for the item(s) in the shopping cart and creates a one-way hash of the order information. Here, for example, at least some of the order information is form-filled data that is hidden from the consumer 102. According to an embodiment, script provided to the merchant 112 by the service provider 126 resides on the merchant server 204 and generates the one-way hash. Then, as indicated at encircled reference number 3, the merchant server 204 provides the one-hash and order information when generating the merchant page 122, an example of which is illustrated in FIG. 3.

Figure 3:
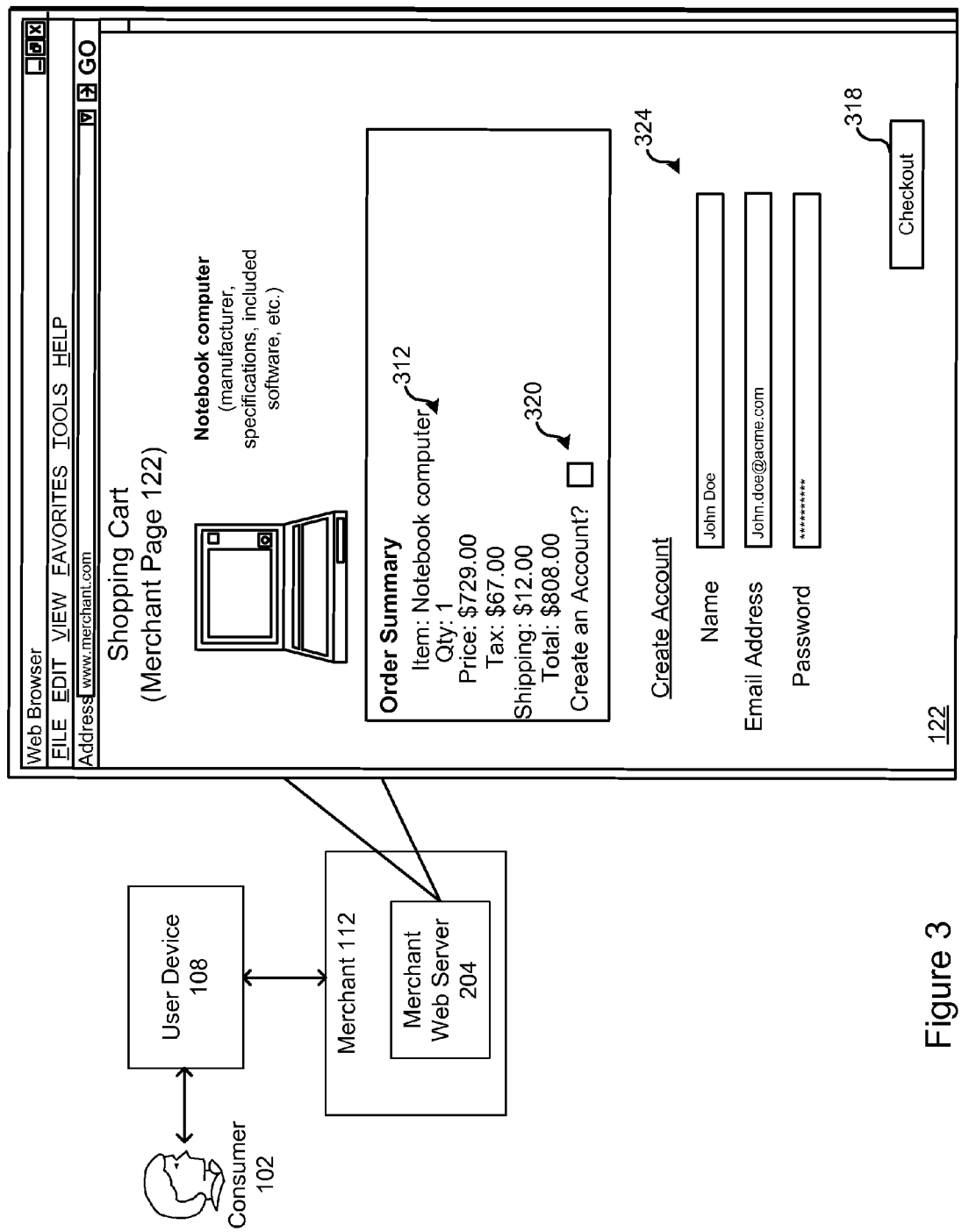
FIG. 3 provides an illustration of an example merchant webpage, according to an embodiment.
Figure 4:
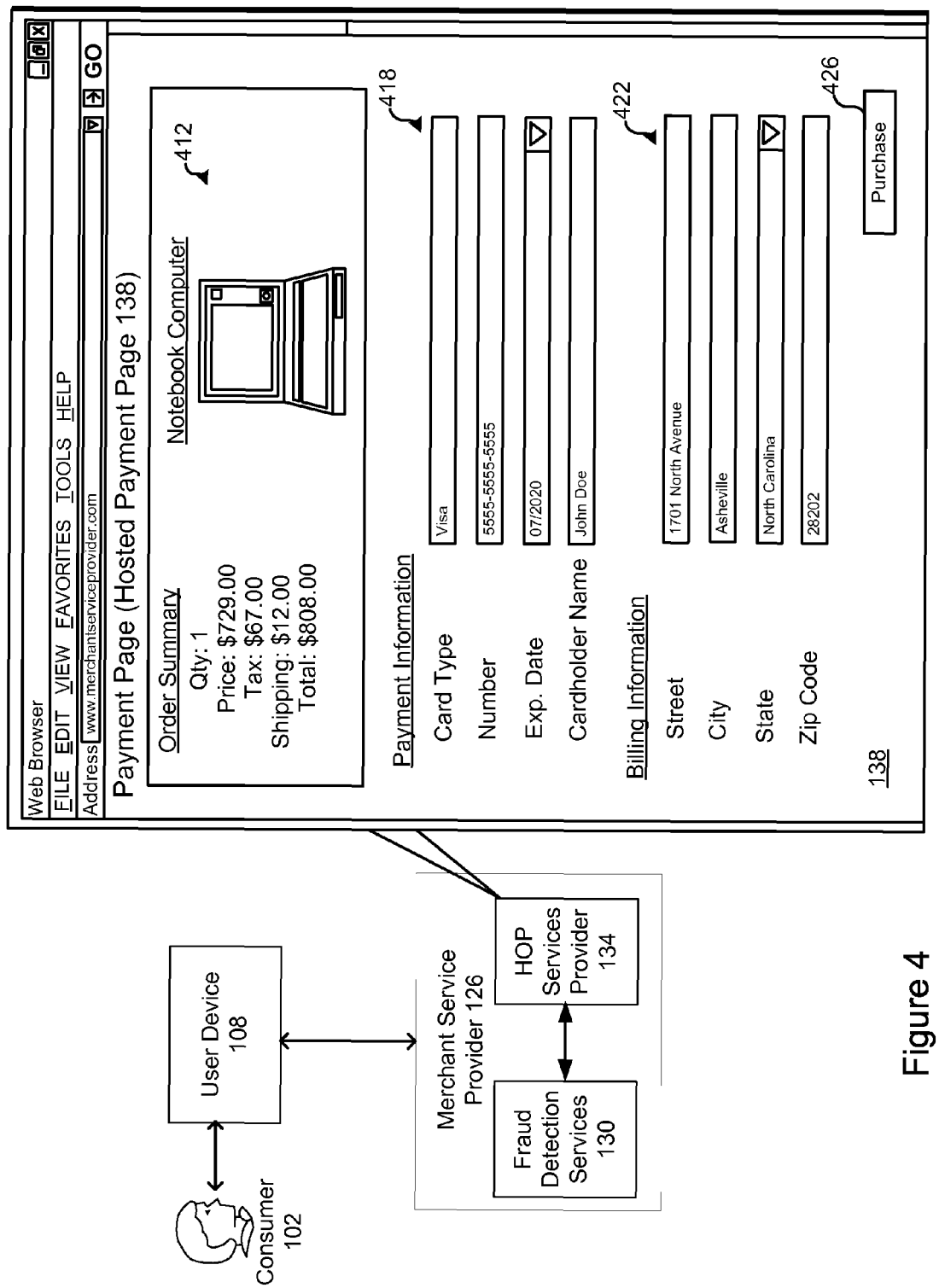
FIG. 4 provides an illustration of an example hosted order webpage, according to an embodiment.

As illustrated in FIG. 3, the merchant page 122 may be a shopping cart page that provides a summary of order information 312, which, beyond what is illustrated in FIG. 3, may include, for example, an order number, customer information, item information (e.g., SKU data), etc. The merchant page 122 may provide the user with the option of creating an account with the merchant 112, if the user does not already have an account. For example, the merchant page 122 may display a "Create An Account" check box 320 and/or the merchant page 122 may display a "Create Account" section 324. To create an account, the consumer 102 may check the check box 320 and/or the consumer 102 may provide the information (e.g., name, email address or userID, and password) requested in the "Create Account" section 324.

As indicated at encircled reference numeral 4 of FIG. 1, when the consumer 102 presses the "Checkout" button 318 on the merchant page 122, the merchant server 204 sends the order information 312, the one-way hash, and the request to create an account to the HOP services provider 134 of the service provider 126. For example, the "Checkout" button 318 may include a URL that redirects the user device 108 to a location at the HOP services provider 134. When the redirect occurs, the order information, the one-way hash, and the request to create an account are transmitted via the SSL pipe 149 from the merchant server 204 of the merchant 112 to the HOP services provider 134 by way of the redirect through the user device 108. In this example, the one-way hash, the order information, and the request to create an account are provided to the HOP services provider 134 in an HTML post. It should be appreciated that the merchant server 204 may send the order information, the one-way hash, the request to create an account, and any other desired information to the services provider 134 in any way known to those having ordinary skill in the art, such as via a direct connection between the merchant and the services provider.

Referring to encircled reference number 5, the HOP services provider 134 verifies the one-way hash provided by the merchant by applying its own copy of the hashing script to the order information to generate its own one-way hash of the order information and then comparing the hash it generates to the hash provided by the merchant. If the one-way hash is verified and thereby confirms that the order information was not tampered with during transmission from the merchant 112, then the HOP services provider 134 provides the hosted payment page 138 to the consumer 102. An example of the hosted payment page 138 is provided in FIG. 4. For example, the hosted payment page 138 may include a summary of the order information 412, input fields 418 into which users may input their credit card information, e.g., credit card type, number, expiration data, etc., and input fields 422 into which user may input billing address information for the credit card, and a "Purchase" button 426 that user may select to submit their order. Referring to encircled reference number 6, the consumer 102, via the user device 108, inputs the payment information. For example, the consumer 102 inputs his or her credit card information into input fields 418 and his or her billing address information into input fields 422 and then presses the "Purchase" button 426.

It should be noted that, in the illustrated example, the payment information is transmitted via SSL pipe 150 from the user device 108 to the HOP services provider 134 and bypasses the merchant 112 altogether. Thus, the merchant 112 does not handle the payment information and therefore does not have to be PCI compliant.

Referring to encircled reference number 7, when the consumer 102 presses the "Purchase" button 426 and sends the payment information to the HOP services provider 134, the HOP services provider 134 forwards the payment information received from the consumer 102 as well as the order information received from the merchant 112 to the transaction services 136 via link 140.

The transaction services 136 accesses the user profile data 142 to determine whether the consumer already has an account/profile stored at the merchant service provider 126. If the consumer 102 already has a profile, then the transaction services 136 updates the payment information and the billing information in the consumer's account/profile with the payment information and the billing information that the consumer inputted into input fields 418 and 422 of the hosted payment page 138. If the consumer 102 does not already have a profile, then the transaction services 136 creates an account/profile for the user in the user profile data 142 and stores in the newly created account/profile the payment information and the billing information that the consumer inputted into input fields 418 and 422 of the hosted payment page 138. Further, the merchant service provider 126 instructs the tokenization module 148 to tokenize the payment information inputted by the user and thereby create a payment token for the payment information. It should be appreciated that the tokenization module 148 may create a unique payment token for each payment account (e.g., for each credit card) stored in the consumer's profile. The merchant service provider 126 then sends a copy of the payment token(s) to the merchant 112, which stores the payment token(s) on its database. The payment token(s) may be sent from the services provider 126 to the merchant 112 according to any means known to those having ordinary skill in the art. For example, the token(s) may be redirected to the merchant via the user device or the tokens may be sent directly to the merchant via connection 156. The merchant 112 may also create an account/profile for the consumer on its database and stores the payment token(s) in the consumer's account/profile.

Figure 5:
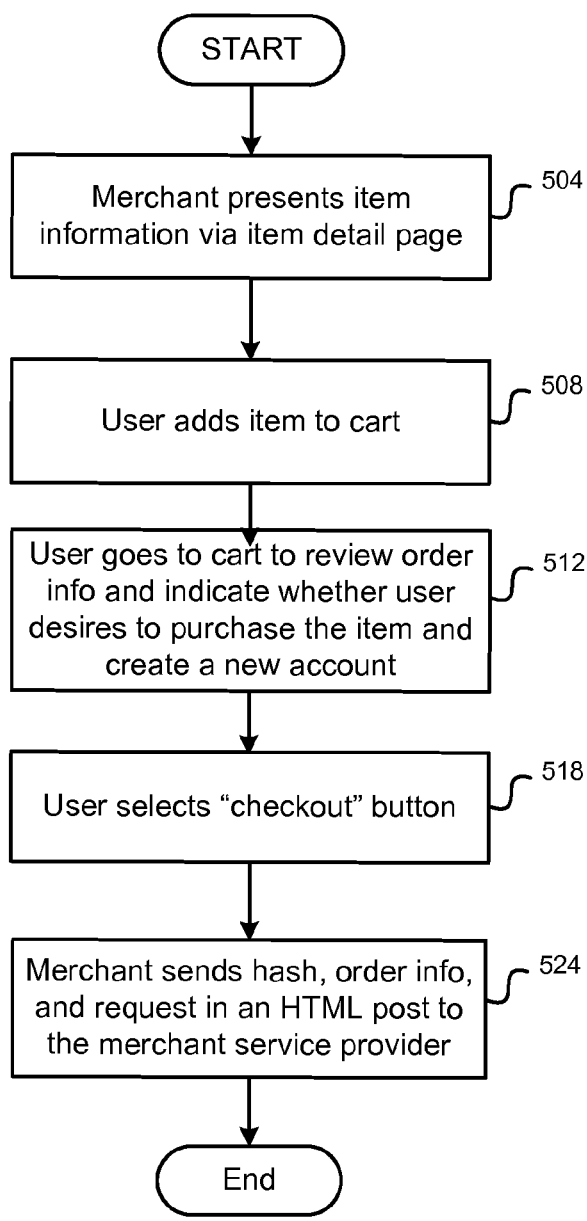
FIG. 5 provides a flow diagram of an example process for enabling a merchant to send order information along with a request to create an account for a user to a merchant service provider, according to an embodiment.

An example process 500 is provided in FIG. 5 whereby the process enables a merchant to securely send order information along with a request to create an account for a consumer to a merchant service provider, according to an embodiment. According to embodiments, a merchant 112 presents item information about a particular item to a consumer 102 via an item detail page (504), such as the merchant page 118 of FIG. 2. In the illustrated embodiment, the merchant web server 204 generates the merchant page 118 and the consumer 102 can view the page 118 via the user device 108. Next, the consumer 102 adds the item to the consumer's shopping cart (508). For example, as illustrated in FIG. 2, the consumer 102 presses the "Add to Cart" button 210. After the consumer 102 adds the item to the shopping cart, the consumer 102 navigates to the shopping cart for the purpose of checking out and buying the item and, if applicable, indicating whether the consumer would like to create a new account (512). For example, as illustrated in FIGS. 2 and 3, the consumer 102 presses the "Go to Cart" button 220 of the merchant page 118 and thereby causes the web server 204 to take the consumer 102 to the merchant page 122 (e.g., the shopping cart page) of FIG. 3, where the consumer 102 can review the order information 312 and create a new account, if applicable.

In operation, according to some embodiments, upon the consumer 102 pressing the "Go to Cart" button 220, the merchant web server 204 obtains the order information for the items to be displayed in the shopping cart and applies a hashing script/program to the order information to generate a one-way hash of the order information. The merchant web server 204 then provides the hash and the order information to the shopping cart page 122. For example, the hash and order information are provided to the shopping card page 122 in an HTML post.

At merchant page 122, the consumer may indicate that the consumer would like to create an account with the merchant. For example, the consumer may check the "Create An Account" check box 320 and/or input the appropriate information (e.g., name, email address or userID, and password) into the input fields of the "Create Account" section 324. If the consumer 102 intends to purchase the items presented on the shopping cart page, then the consumer 102 presses the "Checkout" button 318 (518) and thereby causes the merchant web server 204 to send the order information, the one-way hash of the order information, and the new account request to the HOP services provider 134 (524). For example, the merchant web server 204 sends the order information, the hash, and the new account request to the HOP services provider 134 of the services provider 126 via the consumer device 108 in the form of a HTML post.

Figure 6:
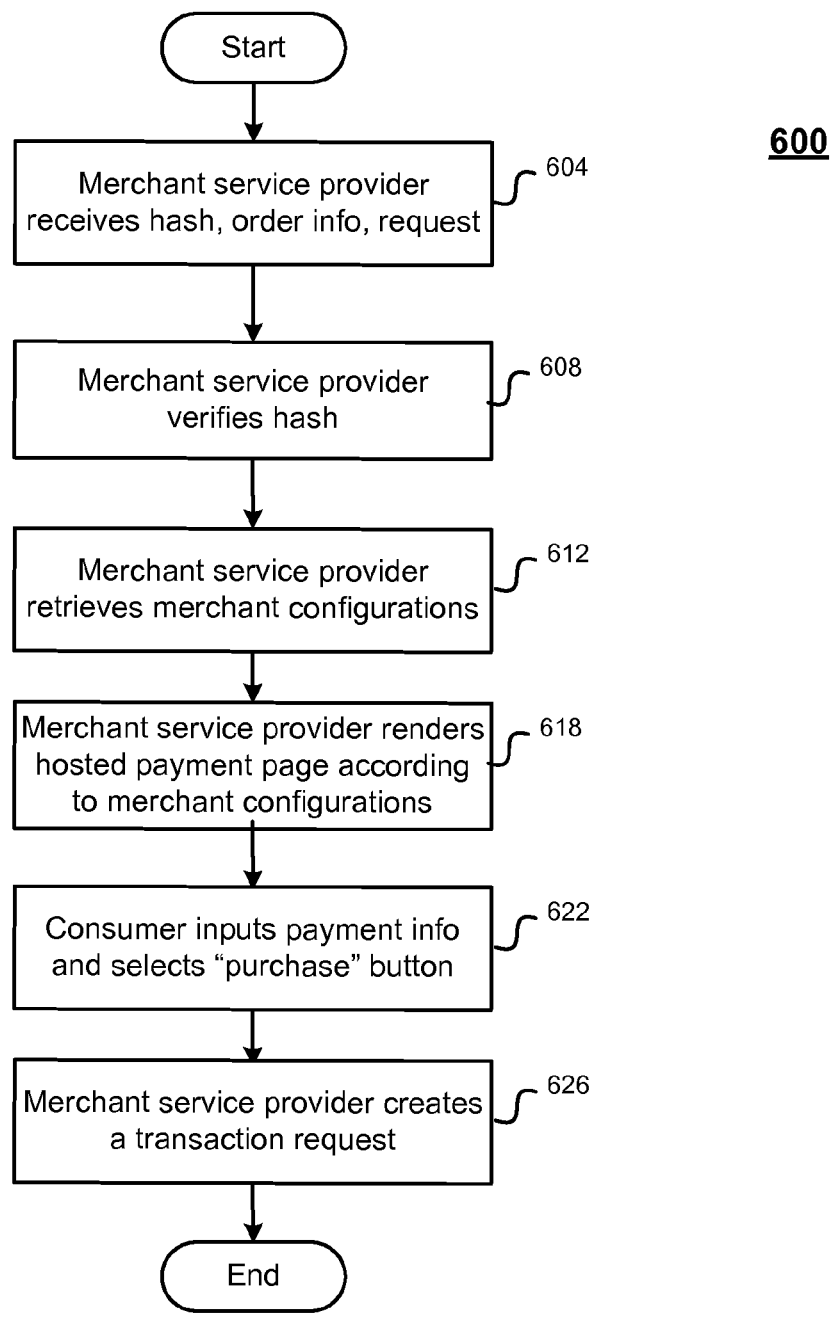
FIG. 6 provides a flow diagram of an example process for enabling a merchant service provider to obtain payment information from a user, according to an embodiment.

An example process 600 is provided in FIG. 6 whereby the process enables a merchant service provider to obtain payment information from a consumer, according to an embodiment. According to embodiments, the HOP services provider 134 receives the order information, the hash of the order information, and the request to create an account from the merchant web server 204 (604), and the HOP services provider 134 verifies the hash provided by the merchant (608). For example, the HOP services provider applies its own copy of the hashing script to the order information to generate its own hash of the order information and then compares the hash it generated to the hash provided by the merchant. If the hash is verified, then the HOP services provider 134 searches the merchant configuration data 146 to obtain the merchant's 112 configurations regarding rendering the hosted payment page to the customer on behalf of the merchant (612). For example, the merchant 112 may specify that the hosted payment page (e.g., page 138 of FIG. 4) only provide input fields for collecting payment information or that it provide input fields for collecting payment information as well as the relevant order summary information.

The HOP services provider 134 renders the payment page according to the merchant's configurations (618), and the consumer 102 may input and submit payment information (622). For example, the HOP services provider 134 may render a hosted webpage such as the hosted payment page 138 illustrated in FIG. 4. Upon viewing the hosted payment page via the user device 108, the consumer 102 may use the consumer device 108 to review the order information 412, input credit card information into the payment input fields 418, and input billing address information into the billing address information fields 422. After reviewing and inputting information, the consumer 102 may submit the payment information to the HOP services provider 134 by selecting the "Place Order" or "Purchase" button 426. As discussed, in the illustrated example, the payment information is transmitted from the user device 108 to the HOP services provider 134 via the SSL pipe 149 and bypasses the merchant 112. Thus, the merchant does not handle the payment information and therefore does not have to be PCI compliant. The HOP services provider 134 creates a transaction request that includes the payment information received from the consumer 102 as well as the order information and the request to create an account received from the merchant 112 (626) and sends the transaction request to transaction services 136 (630).

Figure 7:
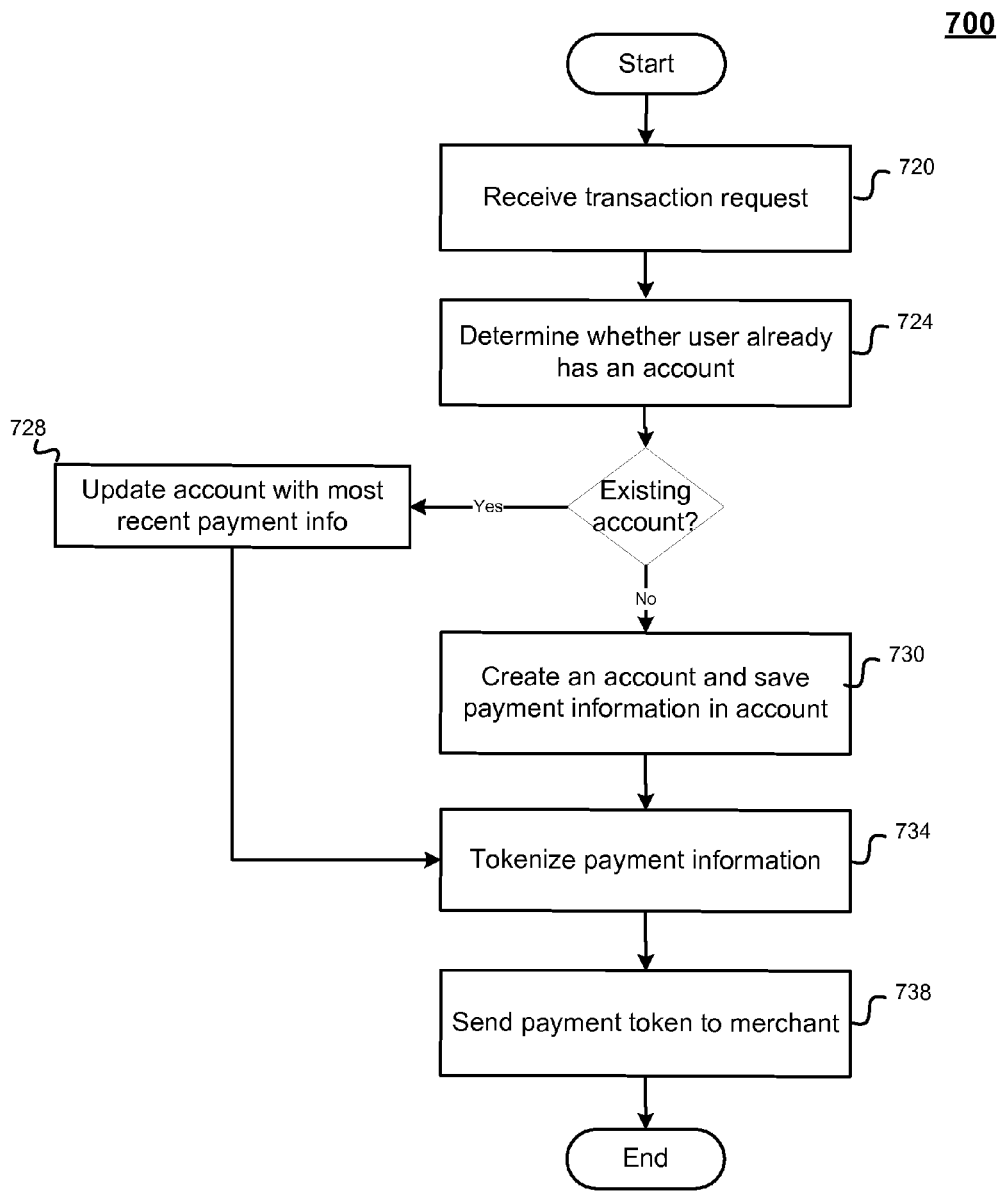
FIG. 7 provides a flow diagram of an example process for enabling a merchant service provider to create an account for a user, save the user's payment information in the account, and tokenize the user's payment information, according to an embodiment.

An example process 700 is provided in FIG. 7 whereby the process enables a merchant service provider to create an account for a user, save the user's payment information in the account, and tokenize the user's payment information, according to an embodiment. According to embodiments, the transaction services 136 receives the transaction request from the HOP service provider 134 (720). The transaction services 136 accesses the user profile data 142 to determine whether the consumer already has an account stored on the service provider's 126 databases (724). For example, if the consumer 102 already has an account that includes payment information, the process 700 involves updating the consumer's account to include the most recent payment information provided by the consumer to the HOP services (728).

On the other hand, if the services provider 126 does not have an account for the consumer, then the transaction services 136 creates an account for the consumer 102 in the user profile data 142 and saves the consumer's payment information in the account (730). The transaction services 136 then instructs the tokenization module 148 to tokenize the payment information in the consumer's account so as to create a payment token (734) for each payment account and then pass the payment token(s) back to the merchant 112 (738). It should be appreciated that the payment token(s) may be sent to the merchant 112 via connection 156 or via a redirect through the user device 108 using the SSL pipe 149. The merchant then saves the payment token(s) in the consumer's account on the merchant's databases.

Figure 8:
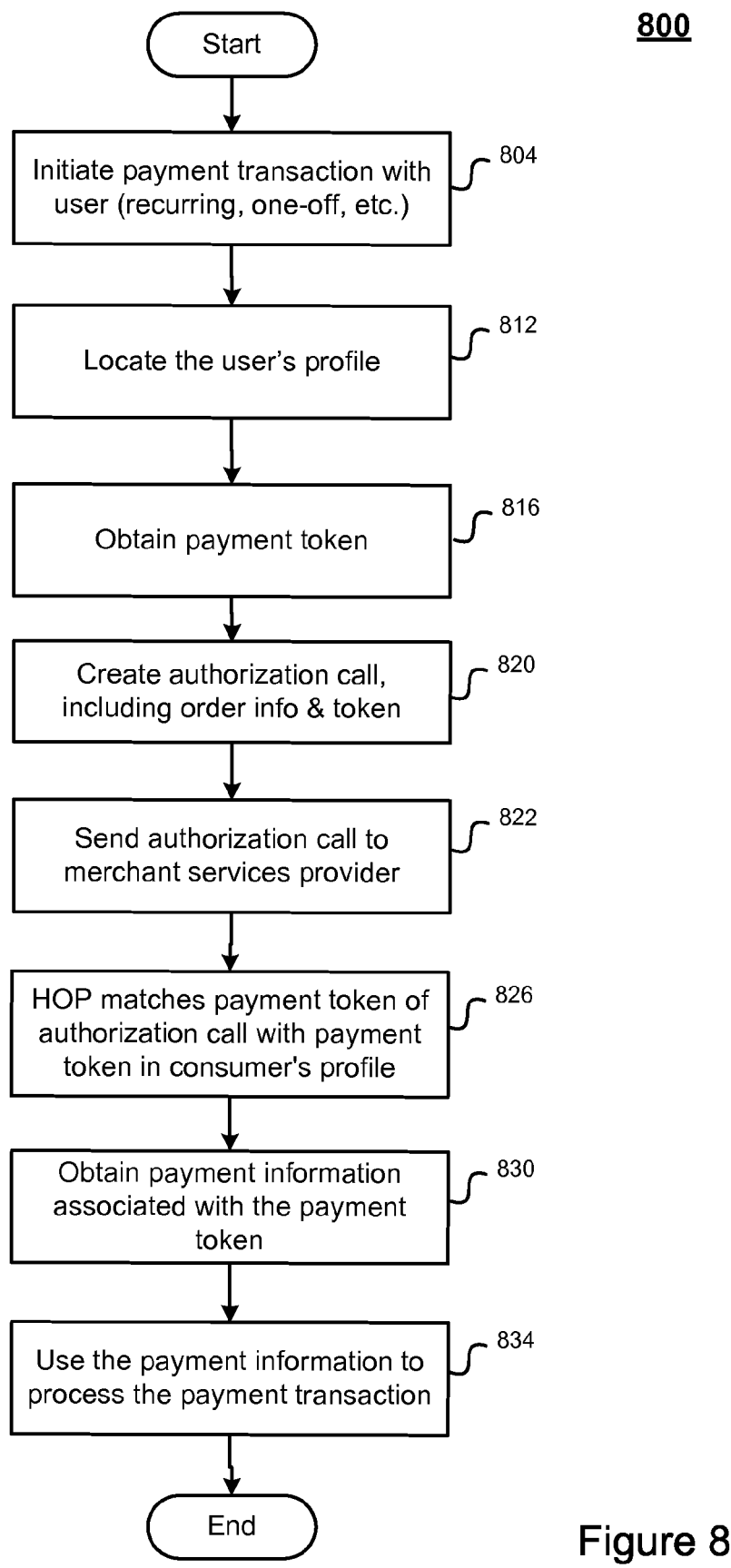
FIG. 8 provides a flow diagram of an example process for enabling a merchant to pass payment tokens—instead of actual payment information—to an HOP/SOP provided by a merchant service provider, according to an embodiment.

An example process 800 is provided in FIG. 8 whereby the process enables a merchant to pass payment tokens—instead of actual payment information—to an HOP provided by a merchant service provider, according to an embodiment. According to embodiments, the merchant and a consumer initiate a purchase transaction (804), where the consumer has already created an account with the merchant and the consumer's profile, which includes at least a payment token, is stored on the merchant's database and in the user profile data 142 of the merchant service provider 126. For example, the consumer may navigate to the merchant's ecommerce website, select an item, and attempt to purchase the item. Also for example, the consumer may have previously signed up for a recurring billing arrangement with the merchant. For example, the merchant may be an online newspaper publisher and the consumer may have purchased a subscription for the newspaper, where the consumer agreed to have his credit card charged on a monthly, recurring basis.

Upon initiation of the purchase transaction, the merchant locates the consumer's profile on the merchant's database (812) and obtains the payment token (816) associated with the consumer's payment information. The merchant then creates an authorization call, which includes the order information and the payment token (820). The merchant then sends the authorization call to the merchant service provider 126 (822). The merchant service provider 126, upon receiving the payment token, locates the payment token stored in the consumer's account in the user account data 146 that matches the payment token that was included in the authorization call (826). The merchant then obtains the payment information that is associated with the payment token (830) and uses that payment information to process the purchase transaction (834).

According to an embodiment, a the authorization call from the merchant may be a subscription request that includes order information and the payment token, where the order information provides details regarding the subscription. Such subscription details may include payment frequency (e.g., monthly, annually, etc.), duration (e.g., six months, one year, two years, etc.), and payment amount. In this case, the merchant service provider uses the subscription details information provided in the subscription request to process subscription payments on behalf of the merchant without the merchant having to prompt the merchant service provider each time a payment is to be processed. For example, an online newspaper publisher may enter a subscription agreement with a consumer whereby the consumer agrees to pay twenty dollars per month for one year, the payment to be made on the first day of each month. In this example, the online newspaper publisher would send the merchant service provider a subscription request that instructs that the merchant service provider to process a payment on the first day of each month for one year. This way, the online newspaper publisher does not have to submit an authorization call to the merchant service provider each time a payment is due under the subscription.

Figure 9:
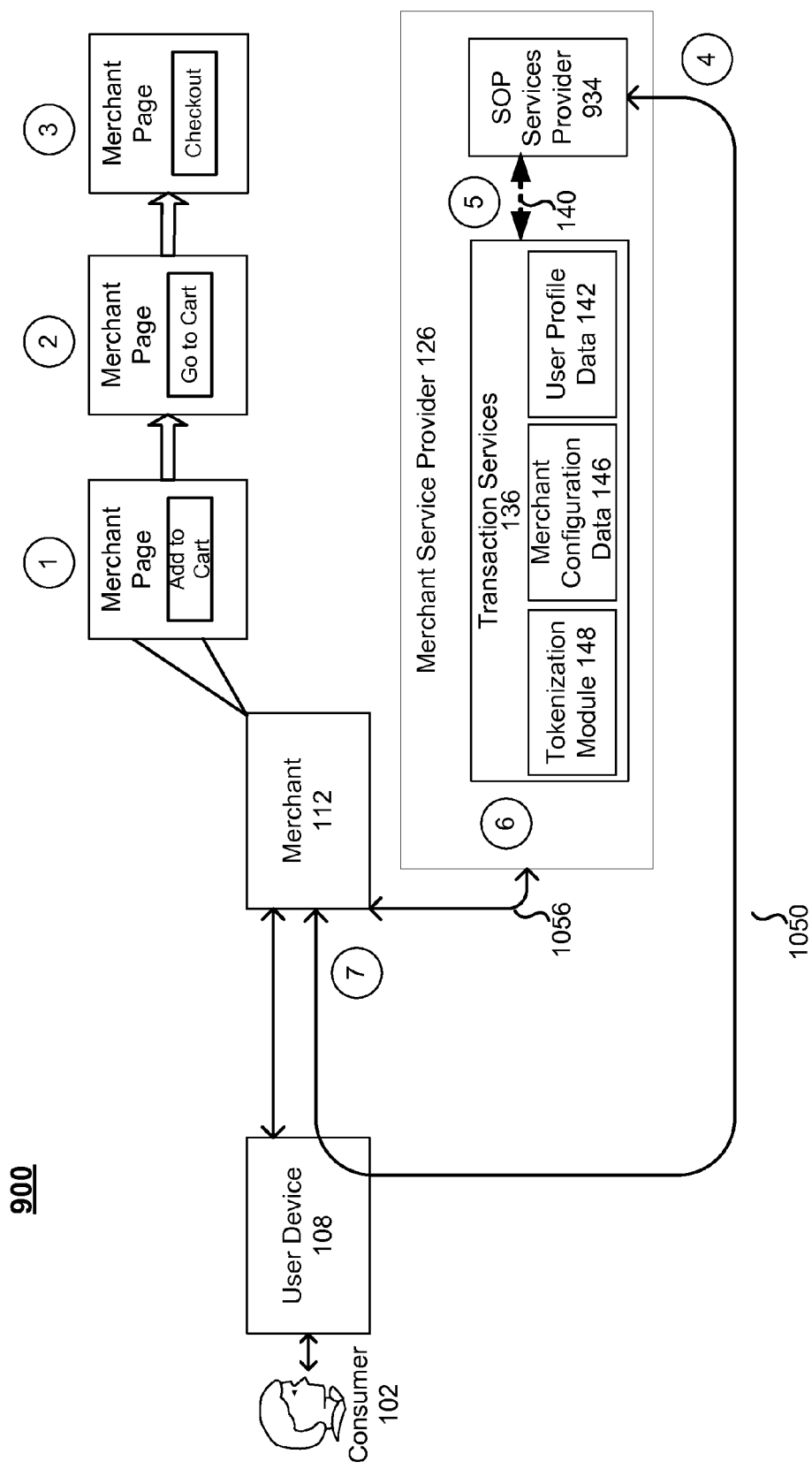
FIG. 9 provides a block diagram of an example operating environment in which embodiments of the invention can be implemented.

FIG. 9 is a block diagram of an example of an operating system 900 in which embodiments of the invention can be implemented.

The system 900 of FIG. 9 includes similar components as the system 100 of FIG. 1 except, for example, instead of having an HOP services provider 134, the system 900 includes an SOP services provider 934. Operation of the system 900 is similar to the operation of system 100 in some regards except, for example, instead of relying on the HOP services provider 134 to host the payment page (e.g., hosted payment page 138 of FIG. 4), the merchant 112 of FIG. 9 hosts its own payment page 1022, an example of which is provided in FIG. 10, and the SOP services provider 934 is used to provide the merchant 112 with a SOP.

Exemplary operation of the system 900 will now be described with reference to the encircled reference numerals 1-7 provided in FIG. 9. It should be appreciated that the encircled reference numerals are provided for illustrative convenience and are not intended to limit ways in which data may flow or the order in which steps may be executed in the system 900. For example, data may flow to and from any component of the system 900 in any order. This example will be discussed with reference to FIGS. 2, 3, and 10.

Referring to encircled reference numeral 1, this example begins with the consumer 102 visiting the merchant page 118 (see FIG. 2), which is provided by a merchant web server 204. While visiting the merchant page 118, the consumer 102 can view details for a particular item and the consumer 102 may select the "Add to Cart" button 210 to add one or more items to his or her electronic shopping cart. Further, as indicated at encircled reference numeral 2, the consumer 102 may select the "Go to Cart" button 220 to navigate to a webpage that displays order information for the items that are in the consumer's electronic shopping cart. The merchant page 122 is an example of such a page and is illustrated in FIG. 3. For example, as illustrated in FIG. 3, the merchant page 122 may provide a summary of the order information 312, which, beyond what is illustrated in FIG. 3, may include, for example, an order number, customer information, item information (e.g., SKU data), etc.

The merchant page 122 may further provide the user with the option of creating an account with the merchant 112, if the user does not already have an account. For example, the merchant page 122 may display a "Create An Account" check box 320 and/or the merchant page 122 may display a "Create Account" section 324. To create an account, the consumer 102 may check the check box 320 and/or the consumer 102 may provide the information (e.g., name, email address or userID, and password) requested in the "Create Account" section 324.

Figure 10:
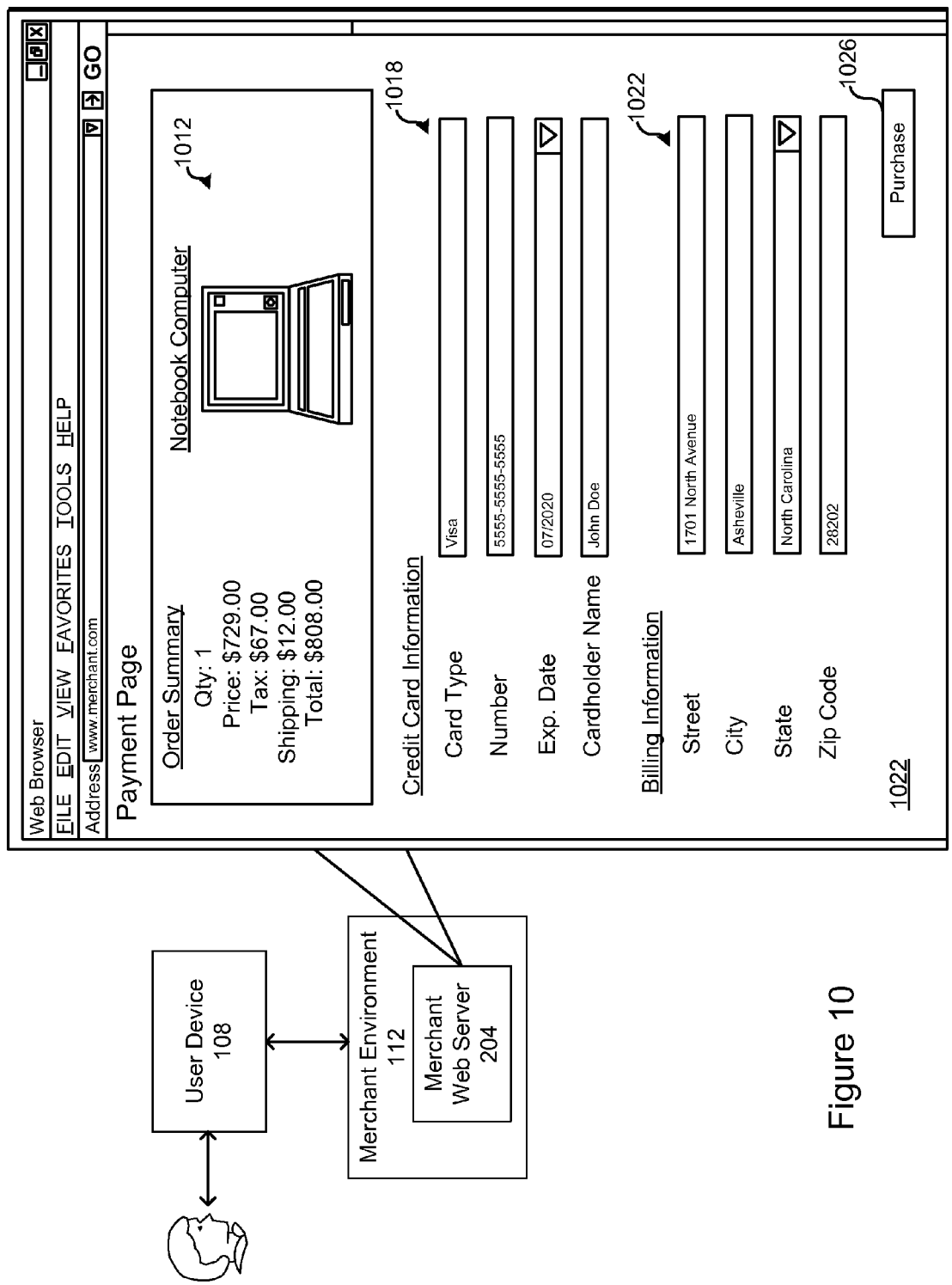
FIG. 10 provides an illustration of an example webpage having hosted input fields, according to an embodiment.

As indicated at encircled reference numeral 3 of FIG. 9, when the consumer 102 presses the "Checkout" button 318 of FIG. 3, the merchant server 204 provides a payment page, an example of which is provided in FIG. 10. For example, the payment page 1022 may include a summary of the order information 1012, input fields 1018 into which users may input their credit card information, e.g., credit card type, number, expiration data, etc., and input fields 1022 into which users may input billing address information for the credit card. The consumer 102, via the user device 108, inputs his or her credit card information into input fields 1018 and his or her billing address information into input fields 1022 and then presses the "Purchase" button 1026.

As indicated at encircled reference numeral 4 in FIG. 9, after the user inputs his or her payment information into payment page 1022, the merchant 112 transmits the payment information, the order information, and a request to create an account/profile to the SOP services provider 934. It should be noted that, in the illustrated example, the merchant 112 does not store the payment information, but instead transmits the payment information to the SOP services provider 934. Thus, because the merchant 112 does not store payment information, the merchant 112 does not have to be PCI compliant. Referring to encircled reference numeral 5, the SOP services provider 934 sends the payment information, the order information, and the request to create an account/profile received from the merchant 112 to the transaction services 136.

Referring to encircled reference numeral 6, the transaction services 136 accesses the user profile data 142 to determine whether the consumer already has an account stored at the merchant service provider 126. If the consumer 102 already has an account, then the transaction services 136 updates the payment information and the billing information in the consumer's account with the payment information and the billing information that the consumer inputted into input fields 1018 and 1022 of the payment page 1022 hosted by the merchant's servers. If the consumer 102 does not already have an account, then the transaction services 136 creates a profile for the user in the user profile data 142 and stores in the newly created profile the payment information and the billing information that the consumer inputted into input fields 1018 and 1022 of the payment page 1022.

Further, the merchant service provider 126 instructs the tokenization module 148 to tokenize the payment information inputted by the user and thereby create a payment token for the payment information. It should be appreciated that the tokenization module 148 may create a unique payment token for each payment account (e.g., for each credit card) stored in the consumer's profile. Then, as indicated at encircled reference numeral 7, the merchant service provider 126 sends a copy of the payment token(s) to the merchant 112, which stores the payment token(s) on its database. It should be appreciated that the merchant service provider 126 may send the payment token(s) via connection 1050 to the user device 108, which sends the copy of the payment token(s) to the merchant 112, and/or the merchant service provider 126 may send the payment token(s) via connection 1056 to the merchant 112 and thereby bypass the user device 108. According to an embodiment, the merchant 112 also creates an account for the consumer on its database and stores the payment token(s) in the consumer's account.

Figure 11:
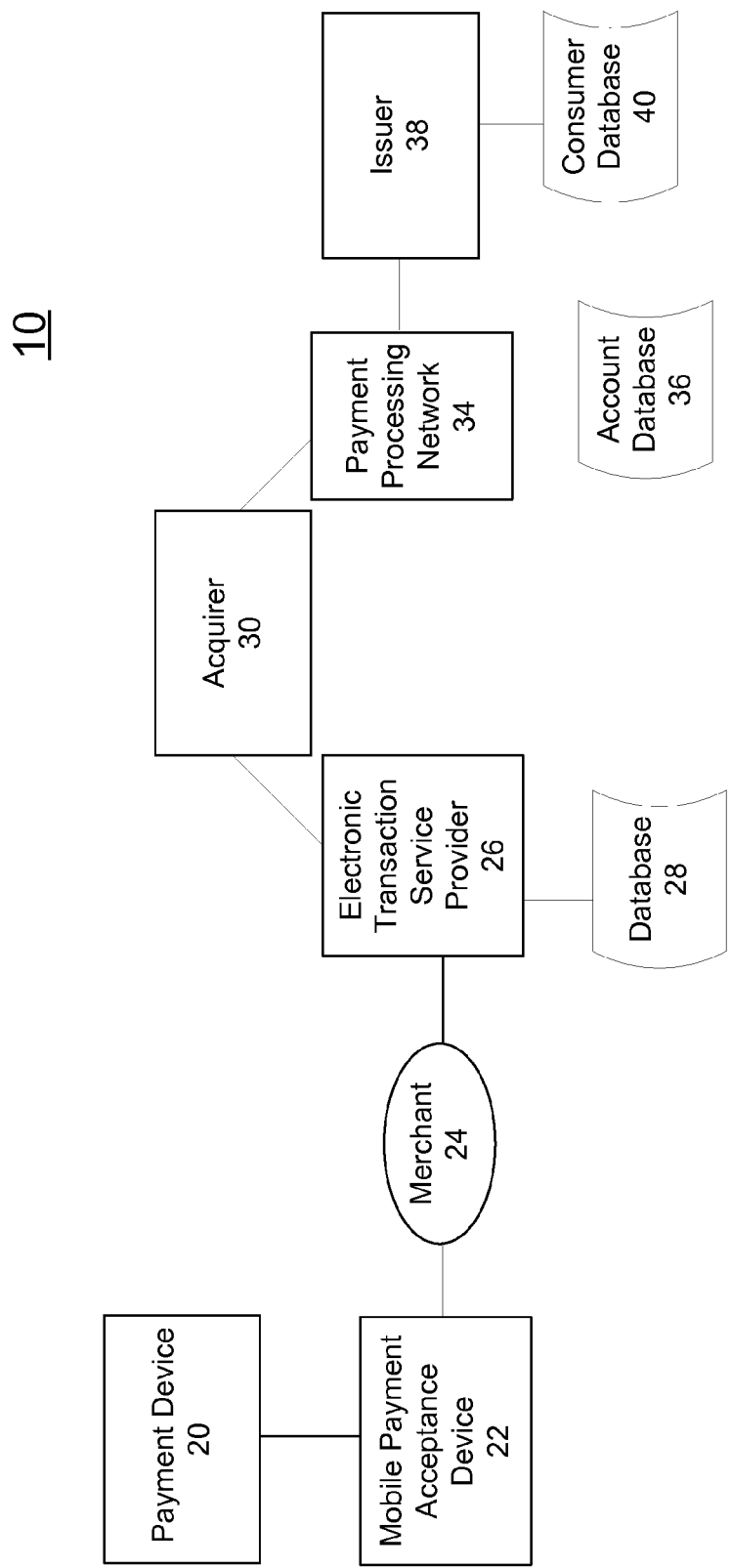
FIG. 11 provides a block diagram of a transaction processing system that may be used with some embodiments of the present invention.

FIG. 11 is a block diagram illustrating a transaction processing system 10 that may be used with some embodiments of the present invention.

FIG. 11 illustrates the primary functional elements that are typically involved in processing a purchase transaction and in the authorization process for such a transaction. As shown in FIG. 11, in a typical purchase transaction, a consumer wishing to purchase a good or service from a merchant uses a payment device 20 to provide purchase transaction data that may be used as part of a consumer authentication or transaction authorization process. Payment device 20 may be a debit card, credit card, smart card, mobile device containing a contactless chip, computer, or other suitable form of device.

The portable payment device is presented to a mobile payment acceptance device 22 of a merchant 24. For example, the acceptance device 22 could be a device reader or point of sale (POS) terminal 22 which is able to access data stored on or within the payment device. In embodiments, the portable payment device communicates account/ payment information to the merchant 24 via a "card not present" transaction over a communications network, such as a cellular network, the Internet, etc. The account data (as well as any required consumer data) is communicated to the merchant 24 and ultimately to a merchant service provider 26 (such as AUTHORIZE.NET). As part of the authentication or authorization process performed by the service provider, the service provider 26 may access database 28, which typically stores data regarding the customer/consumer/user (as the result of a registration process with the merchant, for example), the consumer's payment device, and the consumer's transaction history with the merchant. The database 28 may also include information about the merchant 24, such as a list of the merchant's approved payment acceptance devices 22. For example, upon receiving information about the payment device 20 from the merchant's mobile payment acceptance device 22, the service provider 26 may extract information that identifies the mobile payment acceptance device 22 and validate that information against a list of approved mobile payment acceptance devices. The service provider 26 typically communicates with acquirer 30 (which manages the merchant's accounts) as part of the overall authentication or authorization process. The service provider 26 and/or acquirer 30 provide data to payment processing network 34, which, among other functions, participates in the clearance and settlement processes that are part of the overall transaction processing.

Communication and data transfer between service provider 26 and payment processing network 34 are typically by means of an intermediary, such as acquirer 30. As part of the consumer authentication or transaction authorization process, payment processing network 34 may access account database 36, which typically contains information regarding the consumer's account payment history, chargeback or transaction dispute history, credit worthiness, etc. Payment processing network 34 communicates with issuer 38 as part of the authentication or authorization process, where issuer 38 is the entity that issued the payment device to the consumer and manages the consumer's account. Customer or consumer account data is typically stored in customer/consumer database 40 which may be accessed by issuer 38 as part of the authentication, authorization or account management processes. Note that instead of, or in addition to, being stored in account database 36, consumer account data may be included in, or otherwise part of, customer/consumer database 40.

According to an embodiment, in standard operation, an authorization request message is created by the mobile payment acceptance device 22 during a consumer purchase of a good or service using a portable payment device. In some embodiments, the mobile payment acceptance device 22 of the merchant 24 may be a wireless phone or personal digital assistant that incorporates a contactless card or chip or payment acceptance application. The authorization request message is typically sent from the payment application of the mobile payment acceptance device 22 to the service provider 26, and then to the merchant's acquirer 30, to a payment processing network 34, and then to an issuer 38. An authorization request message can include a request for authorization to conduct an electronic purchase transaction and data relevant to determining if the request should be granted as well as device identification information related to the mobile payment acceptance device 22, which the service provider 26 validates against the list of approved mobile payment acceptance devices 22. For example, it may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent unauthorized access to account or transaction data.

After the issuer receives the authorization request message, the issuer determines if the transaction should be authorized and sends an authorization response message back to the payment processing network to indicate whether or not the current transaction is authorized. The payment processing system then forwards the authorization response message to the acquirer. The acquirer then sends the response message to the service provider 26, which then sends the response message to the merchant's mobile payment acceptance device 22. The merchant is thus made aware of whether the issuer has authorized the transaction, and hence whether the transaction can be completed.

At a later time, a clearance and settlement process may be conducted by elements of the payment/transaction processing system depicted in FIG. 2. A clearance process involves exchanging financial details between an acquirer and an issuer to facilitate posting a transaction to a consumer's account and reconciling the consumer's settlement position. Clearance and settlement can occur simultaneously or as separate processes.

Payment processing network 34 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment processing network 34 may use any suitable combination of wired or wireless networks, including the Internet, to permit communication and data transfer between network elements. Among other functions, payment processing network 34 may be responsible for ensuring that a consumer is authorized to conduct a transaction (via an authentication process), confirm the identity of a party to a transaction (e.g., via receipt of a personal identification number), confirm a sufficient balance or credit line to permit a purchase, or reconcile the amount of a purchase with the consumer's account (via entering a record of the transaction amount, date, etc.).

The payment device 20 may take one of many suitable forms. As mentioned above, the portable payment device can be a mobile device that incorporates a contactless element such as a chip for storing payment information (e.g., a BIN number, account number, etc.) and a near field communications (NFC) data transfer element such as an antenna, a light emitting diode, a laser, etc. The portable payment device may also include a keychain device (such as the Speedpass™ commercially available from Exxon-Mobil Corp.), etc. The device containing the contactless card or chip, or other data storage element may be a cellular (mobile) phone, personal digital assistant (PDA), pager, transponder, or the like. The portable payment device may also incorporate the ability to perform debit functions (e.g., a debit card), credit functions (e.g., a credit card), or stored value functions (e.g., a stored value or prepaid card).

Figure 12:
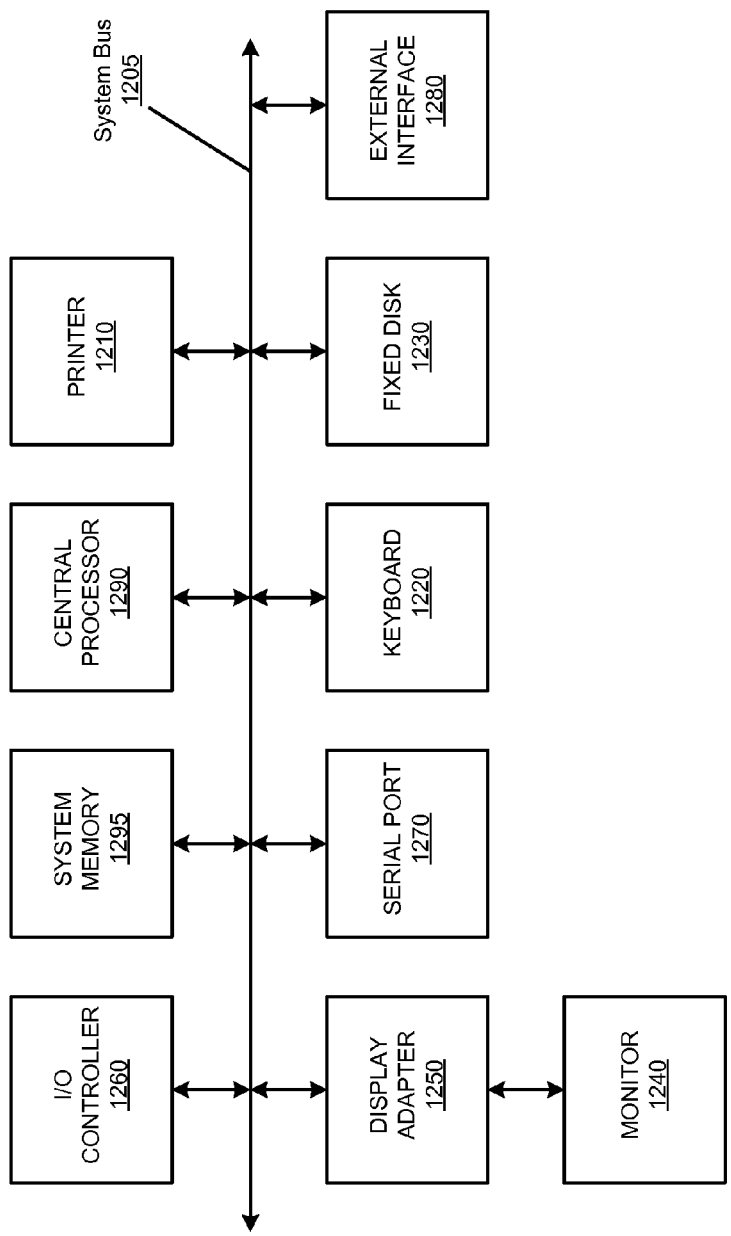
FIG. 12 provides a block diagram of an exemplary computer system in which various embodiments can be implemented.

FIG. 12 shows a block diagram of an exemplary computer apparatus that can be used in some embodiments of the invention (e.g., in any of the components shown in the prior Figures).

The subsystems shown in FIG. 12 are interconnected via a system bus 1205. Additional subsystems such as a printer 1210, keyboard 1220, fixed disk 1230 (or other memory comprising computer-readable media), monitor 1240, which is coupled to display adapter 1250, and others are shown. Peripherals and input/output (I/O) devices, which couple to I/O controller 1260, can be connected to the computer system by any number of means known in the art, such as through serial port 1270. For example, serial port 1270 or external interface 1280 can be used to connect the computer apparatus to a wide area network such as the Internet, a mouse input device, or a scanner. The interconnection via system bus 1205 allows the central processor 1290 to communicate with each subsystem and to control the execution of instructions from system memory 1295 or the fixed disk 1230, as well as the exchange of information between subsystems. The system memory 1295 and/or the fixed disk 1230 may embody a computer-readable medium.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein. For example, although some specific embodiments describe the use of a message conversion process with typical brick and mortar type merchants, embodiments of the invention can also be used in on-line ecommerce type transactions.

Embodiments of the invention are not limited to the above-described embodiments. For example, although separate functional blocks are shown for an issuer, payment processing system, and acquirer, some entities perform all of these functions and may be included in embodiments of invention.

Further, additional embodiments of the invention may be directed to methods and systems involving merchants, and their access devices, as well as issues. For example, other embodiments may include the following additional embodiments.

It should be understood that the present invention as described above can be implemented in the form of control logic using computer software in a modular or integrated manner. Based on the disclosure and teachings provided herein, a person of ordinary skill in the art can know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive or a floppy disk, or an optical medium such as a CDROM. Any such computer-readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary. A recitation of "she" is meant to be gender neutral, and may be read as "he" or "she", unless specifically indicated to the contrary.

All patents, patent applications, publications, and descriptions mentioned above are herein incorporated by reference in their entirety for all purposes. None is admitted to be prior art.

What is claimed is:
1. A method, comprising:
receiving, by a service provider server computer, order information and a request to create an account record from a merchant computer over a first network communication channel, the order information associated with a transaction between a user computer and the merchant computer, the account record storing user information at the service provider server computer;

rendering, by the service provider server computer, a hosted page on behalf of the merchant computer, the hosted page presenting at least a portion of the order information and at least an input field into which the user information may be input via the user computer;

providing, by the service provider server computer, the rendered hosted page to the user computer, wherein the rendered hosted page is displayed on the user computer for the user to input the user information;

receiving, by the service provider server computer, the user information from the user computer over a second network communication channel via the rendered hosted page;

processing, by the service provider server computer, the transaction between the user computer and the merchant computer using the user information;

creating, by the service provider server computer, an account record for the user if the user does not already have an account record, wherein the account record includes entries for one or more accounts of the user;

tokenizing, by the service provider server computer, the user information, the tokenizing including:
creating a unique token for each one of the one or more accounts of the user stored in the account record, wherein the unique token represents the user information, and
storing the user information and the token in the account record; and sending, by the service provider server computer, a copy of the token to the merchant computer, wherein the sending causes the merchant computer to submit the token in a future transaction between the merchant computer and the user computer without requiring the user to provide the user information;

during the future transaction:
receiving, by the service provider server computer from the merchant computer, the copy of the token and a request to process a transaction involving the user;
identifying, by the service provider server computer, the token in the account record of the user that matches the copy of the token provided by the merchant computer;
obtaining, by the service provider server computer, the user information associated with the token; and
responsive to the obtaining, processing, by the service provider server computer, the transaction using the user information associated with the token in the account record of the user instead of providing another rendered hosted page to the user computer for the user to input the user information.

2. The method of claim 1 wherein the merchant computer generates a hash of the order information and transmits the hash along with the order information.

3. The method of claim 2 further comprising:
verifying the hash to ensure that the order information was not tampered with during transmission from the merchant computer.

4. The method of claim 1 wherein creating an account record for user, if the user does not already have an account record, comprises:
determining whether the user already has an account record.

5. The method of claim 4 further comprising:
if it is determined that the user already has an account record, updating the account record with the user information received from the user computer.

6. The method of claim 1 further comprising:
obtaining hosted page configurations designated by the merchant computer, wherein the hosted page is rendered in accordance with the hosted page configurations.

7. A method, comprising:
receiving, at a service provider server computer, order information and a request to create an account record from a merchant computer over a first network communication channel, the order information associated with a transaction between a user computer and the merchant computer, the account record storing user information at the service provider server computer;

receiving, at the service provider server computer, user information from the user computer over a second network communication channel, wherein the user information is sent to the service provider server computer from the user computer and wherein the user information bypasses the merchant computer;

creating, at the service provider server computer, an account record for the user wherein the account record includes entries for one or more accounts of the user;

storing, at the service provider server computer, the user information in the account record of the user;

tokenizing, at the service provider server computer, the user information in the account record of the user, the tokenizing including:
creating a unique token for each one of the one or more accounts of the user stored in the account record, wherein the unique token represents the user information, and
storing the user information and the token in the account record; and transmitting, from the service provider server computer, a copy of the token to the merchant computer, wherein the transmitting causes the merchant computer to submit the token in a future transaction between the merchant computer and the user computer without requiring the user to provide the user information;

during the future transaction:
receiving, by the service provider server computer from the merchant computer, the copy of the token and a request to process a transaction involving the user;
identifying, by the service provider server computer, the token in the account record of the user that matches the copy of the token provided by the merchant computer;
obtaining, by the service provider server computer, the user information associated with the token; and
responsive to the obtaining, processing, by the service provider server computer, the transaction using the user information associated with the token in the account record of the user instead of receiving the user information from the user computer.

8. The method of claim 7 wherein the service provider server computer is a hosted order page (HOP) service provider server computer.

9. The method of claim 8 further comprising:
rendering, at the HOP service provider server computer, a hosted page on behalf of the merchant computer, the hosted page displaying at least a portion of the order information, the hosted page comprising an information entry section for collecting user information; and providing, by the service provider server computer, the rendered hosted page to the user computer, wherein the rendered hosted page is displayed on the user computer.

10. The method of claim 9 further comprising:
obtaining, at the HOP service provider server computer, hosted page configurations designated by the merchant computer, wherein the hosted page is rendered in accordance with the hosted page configurations.

11. The method of claim 9 wherein the user information is received from the user computer via the user information entry section of the hosted page.

12. The method of claim 7 wherein the merchant computer generates a hash of the order information and transmits the hash to the service provider server computer along with the order information.

13. The method of claim 12 further comprising:
verifying, at the service provider server computer, the hash to ensure that the order information was not tampered with during transmission between the merchant computer and the service provider server computer.

14. A system, comprising:
a processor;
a memory device including instructions that, when executed by the processor, cause the processor to:
receive from a merchant computer order information and a request to create an account record over a first network communication channel, the order information associated with a transaction between a user computer and the merchant computer, the account record storing user information at a service provider server computer;
receive user information from the user computer over a second network communication channel, wherein the user information is sent to the service provider server computer from the user computer and wherein the user information bypasses the merchant computer;
create an account record for the user, wherein the account record includes entries for one or more accounts of the user;
store the user information in the account record of the user;
tokenize the user information in the account record of the user, tokenizing including:
creating a unique token for each one of the one or more accounts of the user stored in the account record, wherein the unique token represents the user information, and
storing the user information and the token in the account record; and
transmit a copy of the token to the merchant computer, wherein the transmitting causes the merchant computer to submit the token in a future transaction between the merchant computer and the user computer without requiring the user to provide the user information;
during the future transaction:
receive, from the merchant computer, the copy of the token and a request to process a transaction involving the user;
identify the token in the account record of the user that matches the copy of the token provided by the merchant computer;
obtain the user information associated with the token; and
responsive to the obtaining, process the transaction using the user information associated with the token in the account record of the user instead of receiving the user information from the user computer.

15. The system of claim 14 wherein the instructions, when executed by the processor, further cause the processor to:
render a hosted page on behalf of the merchant, the hosted page displaying at least a portion of the order information, the hosted page comprising an information entry section for collecting user information; and
provide the rendered hosted page to the user computer, wherein the rendered hosted page is displayed on the user computer.

16. The system of claim 15 wherein the instructions, when executed by the processor, further cause the processor to:
obtain hosted page configurations designated by the merchant, wherein the hosted page is rendered in accordance with the hosted page configurations.

17. The system of claim 15 wherein the user information is received from the user computer via the information entry section of the hosted page.

* * * * *